United States Patent
Hopkins

(10) Patent No.: US 9,954,255 B2
(45) Date of Patent: Apr. 24, 2018

(54) MEASUREMENT FIXTURE FOR A BATTERY CELL

(71) Applicant: CHROMA ATE INC., Taoyuan Hsien (TW)

(72) Inventor: James E. Hopkins, Tempe, AZ (US)

(73) Assignee: CHROMA ATE INC., Taoyuan Hsien (TW)

( * ) Notice: Subject to any disclaimer, the term of this patent is extended or adjusted under 35 U.S.C. 154(b) by 222 days.

(21) Appl. No.: 14/884,822

(22) Filed: Oct. 16, 2015

(65) Prior Publication Data

US 2017/0108326 A1 Apr. 20, 2017

(51) Int. Cl.
| | |
|---|---|
| H01M 10/48 | (2006.01) |
| H01M 10/42 | (2006.01) |
| G01B 21/32 | (2006.01) |
| H01M 2/10 | (2006.01) |

(52) U.S. Cl.
CPC ....... *H01M 10/48* (2013.01); *H01M 10/4285* (2013.01); *G01B 21/32* (2013.01); *H01M 2/1061* (2013.01); *H01M 2220/30* (2013.01)

(58) Field of Classification Search
CPC ......... H01M 10/4285; H01M 2220/30; H01M 10/48; G01B 5/30
USPC .......... 73/760, 768, 738, 700; 429/162, 163, 429/181, 184, 185; 340/636.1
See application file for complete search history.

(56) References Cited

U.S. PATENT DOCUMENTS

| | | | | |
|---|---|---|---|---|
| 9,608,299 | B2* | 3/2017 | Adams | H01M 10/4285 |
| 2006/0238162 | A1* | 10/2006 | Cheon | H01M 2/021 |
| | | | | 320/112 |
| 2006/0246345 | A1* | 11/2006 | Yoon | H01M 10/4207 |
| | | | | 429/62 |
| 2009/0186270 | A1* | 7/2009 | Harada | H01M 2/0267 |
| | | | | 429/185 |
| 2009/0322199 | A1* | 12/2009 | Augustino | H01J 37/32091 |
| | | | | 313/243 |
| 2012/0208077 | A1* | 8/2012 | Hohenthanner | H01M 2/06 |
| | | | | 429/179 |
| 2013/0260192 | A1* | 10/2013 | LePort | H01M 10/42 |
| | | | | 429/62 |
| 2014/0333312 | A1* | 11/2014 | Schlag | G01R 31/3606 |
| | | | | 324/426 |
| 2015/0160302 | A1* | 6/2015 | Xu | H01M 10/4285 |
| | | | | 324/427 |
| 2015/0377690 | A1* | 12/2015 | Phelan | G01F 25/0046 |
| | | | | 73/1.34 |

(Continued)

*Primary Examiner* — Manish S Shah
*Assistant Examiner* — Suman K Nath
(74) *Attorney, Agent, or Firm* — Juan Carlos A. Marquez; Marquez IP Law Office, PLLC

(57) ABSTRACT

A measurement fixture for a battery cell is provided when the battery cell is connected to an apparatus. The measurement fixture comprises a chamber, a pressure sensor and an expansion sensor. The chamber defines a sealed space for receiving the battery cell. The pressure sensor is mounted to the chamber to sense a change of pressure in the sealed space due to a volume change of the battery cell to calculate pressure in the battery cell and the volume change of the battery cell non-contactly. The expansion sensor is mounted to the chamber to sense a deformation of the battery cell to calculate a correlation between the pressure in the battery cell and the volume change of the battery cell non-contactly.

16 Claims, 5 Drawing Sheets

(56) References Cited

U.S. PATENT DOCUMENTS

2016/0157371 A1* 6/2016 Glynn ...................... B22F 7/04
312/209

* cited by examiner

MEASUREMENT FIXTURE FOR A BATTERY CELL

FIELD OF THE INVENTION

The present invention relates to volume and pressure measurements of a battery cell, especially a pouch-type battery cell.

BACKGROUND OF THE INVENTION

The demand for portable electronics continues to grow, and with it the demand for rechargeable batteries. There is an increasing demand for manufacturing and testing solutions on all levels of battery production. Lithium-ion battery assemblies are available in many shapes and are used in laptops, automobiles etc., and are made up of different types of battery cells; of these types there are: cylindrical hard side, rectangular hard side, and rectangular flat prismatic. The construction of the cylindrical cells may have the positive and negative terminals at opposing ends of the cylinder. The rectangular hard side type may have the positive and negative posts with threads on one end of the cell, typically on the top. The prismatic battery cell is a thin rectangular cell which typically has the positive and negative terminal extending from one end along the thin side of the battery cell as two large flat thin terminals.

During charge and discharge of a battery cell, the battery cell will expand and contract. This expansion and contraction is coupled with the state of the battery cell. There is a need to monitor the status of the battery cell during the charge-discharge cycle both for characterization purposes as well as for production testing. There is also a need to perform this measurement during the test without affecting the test environment. Doing so would reduce the cycle time required for temperature stability.

SUMMARY OF THE INVENTION

A measurement fixture for a battery cell is provided when the battery cell is connected to an apparatus. The measurement fixture comprises a chamber, a pressure sensor and an expansion sensor. The chamber defines a sealed space for receiving the battery cell. The pressure sensor is mounted to the chamber to sense a change of pressure in the sealed space due to a volume change of the battery cell to calculate the pressure in the battery cell and the volume change of the battery cell non-contactly. The expansion sensor is mounted to the chamber to sense deformation of the battery cell to calculate a correlation between the pressure in the battery cell and the volume change of the battery cell non-contactly.

Thereby, the battery cell is placed into the chamber, which is then sealed and temperature controlled, and the pressure in the battery cell and the volume change of the battery cell are measured non-contactly.

BRIEF DESCRIPTION OF THE DRAWING

The invention is described according to the appended drawings as follows.

DETAILED DESCRIPTION OF THE INVENTION

Figure 1:
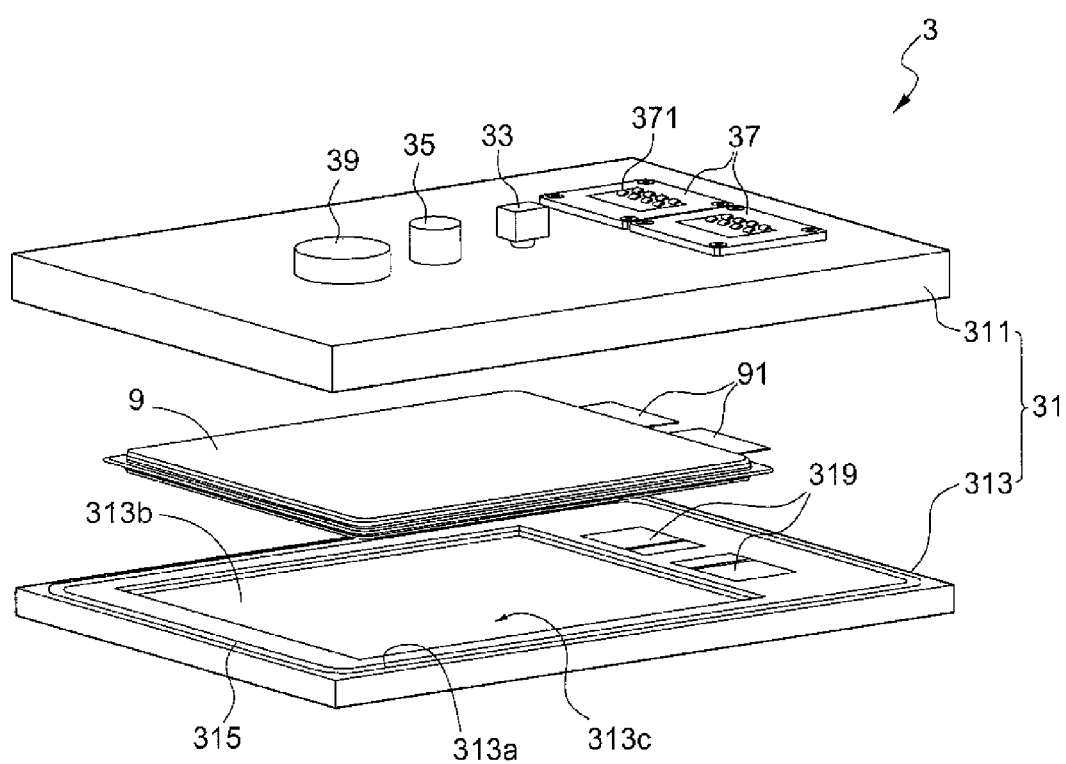
FIG. 1 is an exploded schematic view of a measurement fixture for a battery cell in accordance with a preferred embodiment of the present invention.

During battery cell formation and testing, the battery cell 9, as shown in FIG. 1, will be charged and discharged, which results in expansion and contraction of the battery cell housing. It is needed to measure the amount of displacement of the housing of the battery cell 9 as well as the internal pressure of the battery cell 9 while being charged and discharged, without touching the battery cell 9, with a measurement apparatus. The condition of the battery cell 9 may be monitored continuously or sampled for characterization and control of the charge. The monitoring of the battery cell 9 can be coupled to the control of the charge and discharge manually or automatically. The expansion rate of change within the battery cell 9 indicates the condition of the battery cell 9.

Figure 2A:
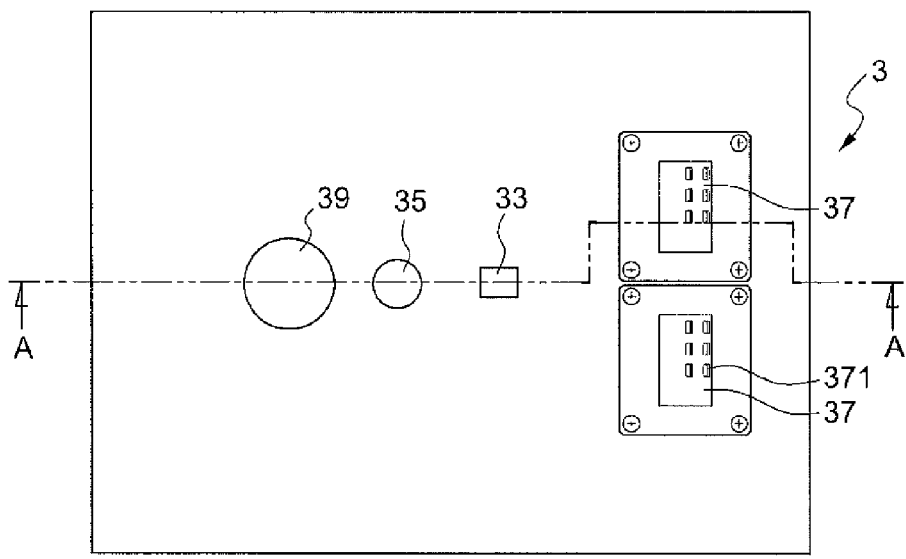
FIG. 2A is a top schematic view of a measurement fixture for a battery cell in accordance with a preferred embodiment of the present invention.
Figure 2B:
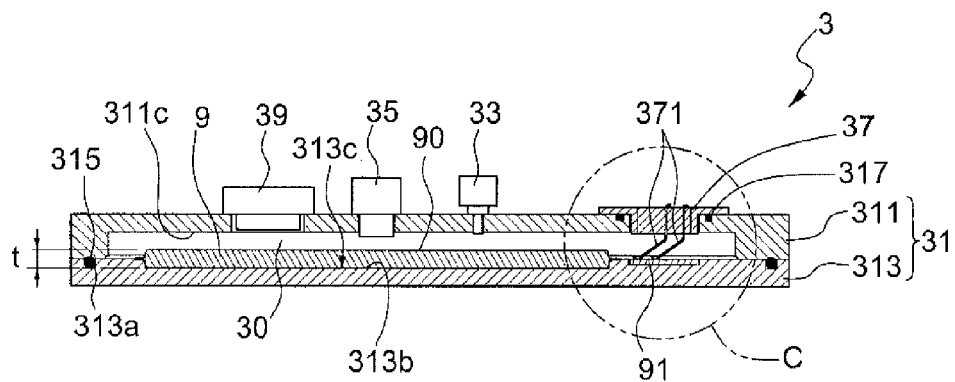
FIG. 2B is a cross-sectional schematic view taken along the cross-sectional line A-A in FIG. 2A.
Figure 3A:
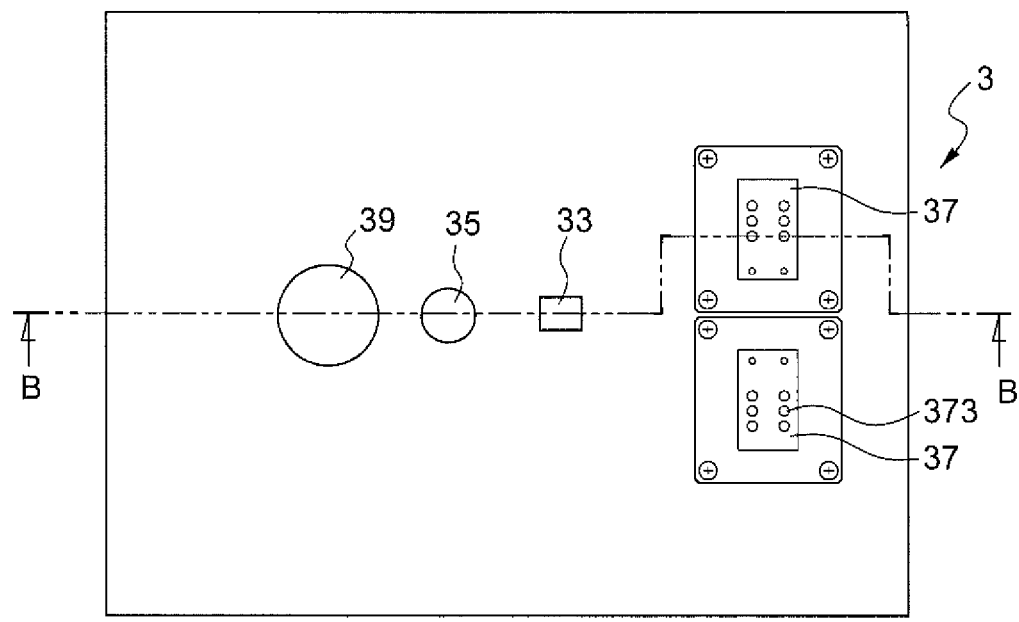
FIG. 3A is a top schematic view of a measurement fixture for a battery cell in accordance with another preferred embodiment of the present invention.
Figure 3B:
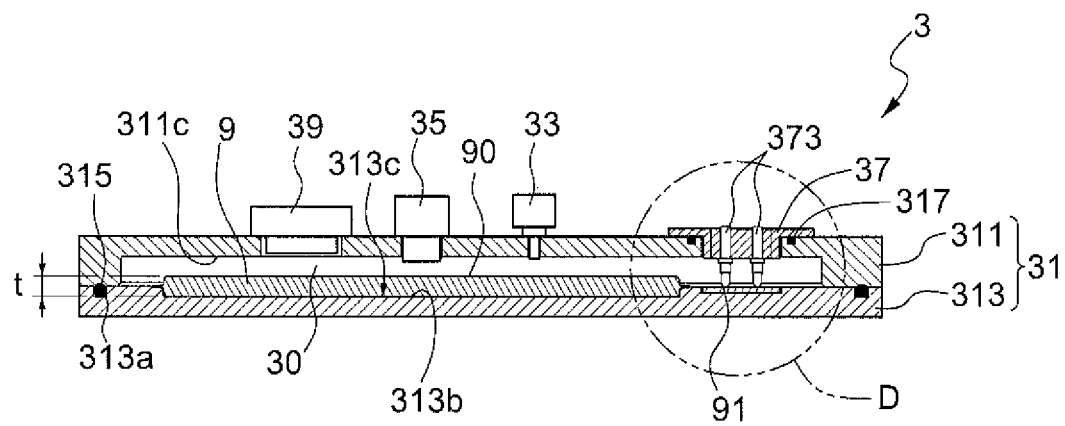
FIG. 3B is a cross-sectional schematic view taken along the cross-sectional line B-B in FIG. 3A.

For the purpose of measuring the pressure in the battery cell 9 and the volume change of the battery cell 9, a measurement fixture 3 as shown in FIG. 1 for the pouch-type battery cell 9 is provided when the battery cell 9 is connected to the testing apparatus (not shown, which can be any kind of testing apparatus used in this field). The measurement fixture 3 comprises a chamber 31, a pressure sensor 33 and an expansion sensor 35. As shown in FIGS. 1, 2B and 3B, the chamber 31 defines a sealed space 30 for receiving the battery cell 9. The pressure sensor 33 is mounted to the chamber 31 to sense a change of pressure in the sealed space 30 due to a volume change of the battery cell 9 to calculate pressure in the battery cell 9 and the volume change of the battery cell 9 non-contactly. The expansion sensor 35 is mounted to the chamber 31 to sense deformation of the battery cell 9 to calculate a correlation between the pressure in the battery cell 9 and the volume change of the battery cell 9 non-contactly. The sealed chamber 31 is temperature controlled and also thermally isolates the environment to prevent heat from transmitting into or out of the sealed space 30 so as to prevent the temperature of the environment from affecting the pressure inside the sealed space 30.

The measurement fixture 3 further comprises at least one contactor 37 mounted to the chamber 31 to contact at least one terminal 91 of the battery cell 9 and to connect the apparatus for testing the battery cell 9. The testing apparatus electrically connects to the at least one terminal 91 of the battery cell 9 via the at least one contactor 37 for testing the battery cell 9 to perform testing or formation of the battery cell 9.

Since the at least one terminal 91 of the battery cell 9 usually comprises a positive terminal and a negative terminal, in one embodiment, the at least one contactor 37 comprises two contactors 37, and the two contactors 37 respectively contact the positive terminal and the negative terminal of the battery cell 9 and respectively connect the positive terminal and the negative terminal to the apparatus. The number of contactors 37 may depend on the number of the terminals 91 of the battery cell 9 since the battery cell 9 may comprise two or more terminals 91 to form a one-to-one relationship. However, in another embodiment, the measurement fixture 3 may only comprise one contactor 37 to contact both the positive terminal and the negative terminal of the battery cell 9 with different contacts and to connect the positive terminal and the negative terminal to the apparatus at the same time.

Please refer to FIGS. 1, 2B and 3B. The chamber 31 comprises a first shell 311 and a second shell 313, and the first shell 311 and the second shell 313 are assembled and sealed together to define the sealed space 30. The chamber 311 comprises a chamber seal 315 between the first shell 311 and the second shell 313 to seal the first shell 311 and the second shell 313 together. In one embodiment, the second shell 313 comprises a groove 313a surrounding the sealed space 30 and the chamber seal 315 is disposed in the groove 313a to seal the first shell 311 and the second shell 313 together.

In the embodiment shown in the drawings, the pressure sensor 33 and the expansion sensor 35 are mounted to the first shell 311, and the battery cell 9 is disposed on the second shell 313. Preferably, the second shell 313 comprises a battery recess 313b, the battery recess 313b has a datum reference surface 313c, and the battery cell 9 is disposed in the battery recess 313b on the datum reference surface 313c. The datum reference surface 313c provides the expansion sensor 35 with a flat reference surface having an unchanged distance to the expansion sensor 35.

The expansion sensor 35 can be a capacitive sensor, an inductive sensor, a laser reflection sensor, an image sensor or any type of a sensor that is capable of non-contactly measuring the deformation of the battery cell 9 in various methods; for example, a sensor which can measure the deflection of a surface 90 of the battery cell 9, a distance from the inner wall 311c of the first shell 311 of the chamber 31 to the surface 90 of the battery cell 9, the volume of the battery cell 9 or the thickness t of the battery cell 9.

In accordance with the embodiment, the battery cell 9 is placed into the chamber 31 which is then sealed and temperature controlled. As the battery cell 9 is charged, the battery cell will expand, and when the battery cell 9 is discharged, it will contract. As the battery cell 9 expands, the volume of the sealed space 30 inside the chamber 31 will be reduced which will increase the pressure which is then measured by the pressure sensor 33. The amount of actual displacement of the surface 90 of the battery cell 9 can be measured by the expansion sensor 35. This information is either displayed, or the data is sent to a control system. Certain characteristics of the testing will be processed by the control system and used in the charge cycle.

This is an example of the calculation of the pressure in the battery cell 9 and the volume change of the battery cell 9. Please refer to FIGS. 2B and 3B. If the thickness t of the battery cell 9 is changed from 10.000 mm to 10.001 mm, the volume of the sealed space 30 is changed from 514883.95 mm$^3$ to 514826.11 mm$^3$, and the pressure in the sealed space 30 is changed from 68 kPa to 68.008 kPa. Therefore, while an increase in the pressure in the sealed space 30 of the chamber 31 of 0.008 kPa is measured, an increase in the thickness t of the battery cell 9 of 1 μm for a particular size of battery cell 9 can be calculated.

The expansion sensor 35 can be removed from the chamber after the correlation between the pressure in the battery cell 9 and the volume change of the battery cell 9 is calculated and calibrated.

Figure 2C:
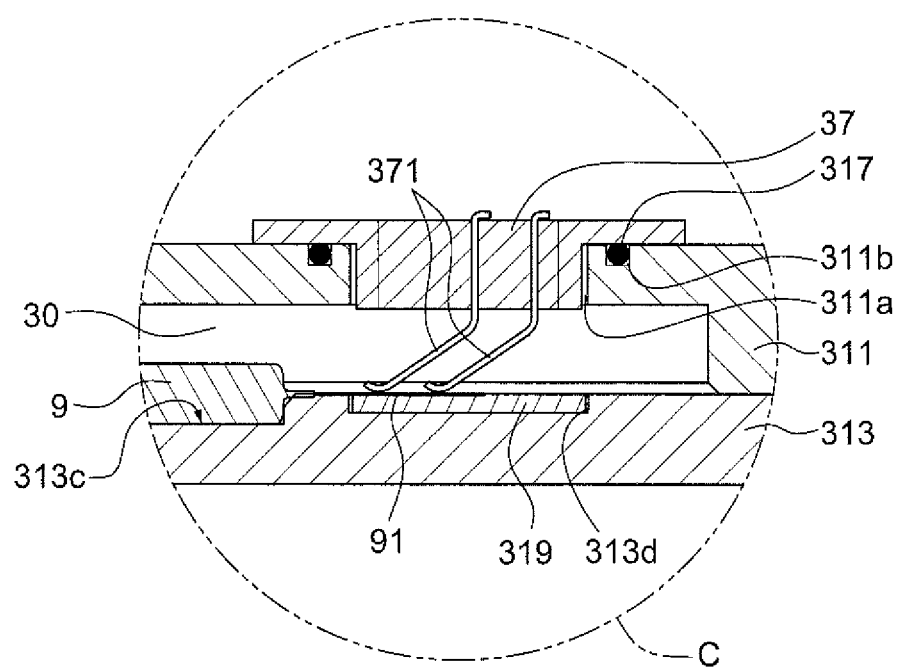
FIG. 2C is a partial enlarged schematic view of the portion C in FIG. 2B.
Figure 3C:
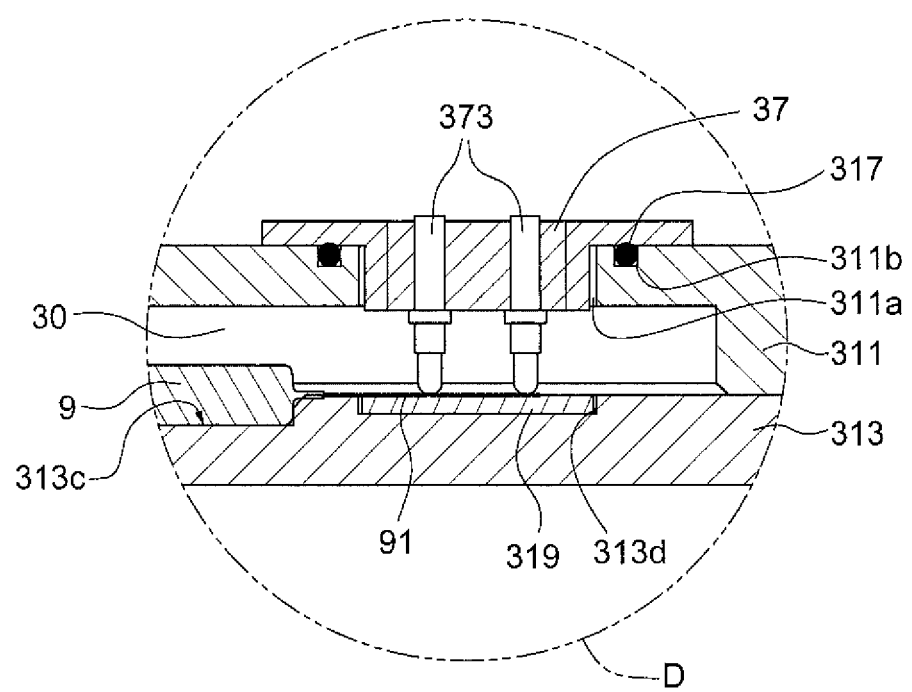
FIG. 3C is a partially enlarged schematic view of the portion D in FIG. 3B.

Please refer to FIGS. 1, 2C and 3C. The measurement fixture 3 further comprises at least one contactor seal 317 between the chamber 31 and the contactor 37 to seal the chamber 31 and the contactor 37 together. In one embodiment, the first shell 311 comprises at least one contactor hole 311a and at least one groove 311b surrounding the contactor hole 311a, the contactor 37 is disposed through the contactor hole 311a to contact the terminals 91 of the battery cell 9 and the contactor seal 317 is disposed in the groove 311b to seal the first shell 311 and the contactor 37 together.

In the embodiments shown in the drawings, the measurement fixture 3 comprises two contactors 37, the first shell 311 correspondingly comprises two contactor holes 311a and two grooves 311b surrounding the contactor holes 311a respectively, the contactors 37 are disposed through the contactor hole 311a respectively and the contactor seals 317 are disposed in the grooves 311b respectively to seal the first shell 311 and the contactors 37 together. The number of the contactor holes 311a and the contactor seals 317 depends on the number of the contactors 37 to form a one-to-one relationship.

Please refer to FIGS. 2A-2C. In one embodiment, each of the contactors 37 comprises at least one cantilever contact 371 to electrically connect one of the terminals 91 of the battery cell 9. Please refer to FIGS. 3A-3C. In another embodiment, each of the contactors 37 comprises at least one spring pin contact 373 to electrically connect one of the terminals 91 of the battery cell 9.

To prevent shortage between the terminals 91 of the battery cell 9, the first shell 311 and the second shell 313 are electrically isolated. Please refer to FIGS. 2C and 3C. In one embodiment, the measurement fixture 3 further comprises at least one electrically conductive backing plate 319, and one terminal 91 is pressed between one contactor 37 and the electrically conductive backing plate 319. The electrically conductive backing plates 319 make contact with the other side of the terminals 91 which results in more contact area for a higher electrical current. In use of the electrically conductive backing plates 319, the specific length or position of the terminals 91 is not critical to the function of the measurement fixture 3. In FIGS. 2C and 3C, both the contacts 371 and 373 are on the terminals 91. However, if the terminals 91 are shortened or the contacts 371 and 373 are repositioned, some of the contacts 371 and 373 could be on the terminals 91 and the others could be on the electrically conductive backing plates 319. The second shell 313 comprises at least one recess 313d, the is electrically conductive backing plate 319 is disposed in the recess 313d, and the contactor 37 is mounted to the first shell 311. Since the battery cell 9 usually comprises a positive terminal and a negative terminal, in a preferred embodiment, the measurement fixture 3 comprises two electrically conductive backing plates 319 respectively disposed in two recesses 313d, and one of the terminals 91 is respectively pressed between one of the contactors 37 and one of the electrically conductive backing plates 319. The number of the backing plates 319 depends on the number of the terminals 91 of the battery cell 9 to form a one-to-one relationship, since the battery cell 9 may comprise two or more terminals 91.

In a preferred embodiment, the measurement fixture 3 further comprises a pressure relief valve 39 arranged to the first shell 311, as shown in FIGS. 2B and 3B. In the event that the pressure inside the sealed space 30 is overly high, the pressure relief valve 39 is activated to reduce the pressure inside the sealed space 30.

The present invention is not limited to only pouch type batteries, any battery which changes size during charge/ discharge cycles could be measured this way. The above-described embodiments of the present invention are intended to be illustrative only. Numerous alternative embodiments may be devised by persons skilled in the art without departing from the scope of the following claims.

What is claimed is:

1. A measurement fixture for a battery cell when the battery cell is connected to an apparatus, the measurement fixture comprising:
   a chamber defining a sealed space for receiving the battery cell;
   a pressure sensor mounted to the chamber to non-contactly sense a change of pressure in the sealed space due to a volume change of the battery cell so as to calculate pressure in the battery cell and the volume change of the battery cell;
   an expansion sensor mounted to the chamber to non-contactly sense deformation of the battery cell to calculate a correlation between the pressure in the battery cell and the volume change of the battery cell;
   at least one contactor mounted to the chamber to contact at least one terminal of the battery cell and to connect the apparatus for testing the battery cell;
   at least one contactor seal between the chamber and the contactor to seal the chamber and the contactor together;
   wherein the chamber comprises a first shell and a second shell and the first shell and second shell are assembled and sealed together to define the sealed space, and wherein the chamber is temperature-controlled and thermally isolates the environment; and
   wherein the first shell comprises at least one contactor hole and at least one groove surrounding the contactor hole, wherein the contactor is disposed through the contactor hole, and the contactor seal is disposed in the groove to seal the first shell and the contactor together.

2. The measurement fixture as in claim 1, wherein the chamber comprises a chamber seal between the first shell and the second shell to seal the first shell and the second shell together.

3. The measurement fixture as in claim 2, wherein the second shell comprises a groove surrounding the sealed space and the chamber seal is disposed in the groove to seal the first shell and the second shell together.

4. The measurement fixture as in claim 1, wherein the first shell and the second shell are electrically isolated.

5. The measurement fixture as in claim 1, further comprising at least one electrically conductive backing plate, the terminal being pressed between the contactor and the electrically conductive backing plate.

6. The measurement fixture as in claim 5, wherein the second shell comprises at least one recess, the electrically conductive backing plate is disposed in the recess and the contactor is mounted to the first shell.

7. The measurement fixture as in claim 1, wherein the pressure sensor and the expansion sensor are mounted to the first shell.

8. The measurement fixture as in claim 1, wherein the battery cell is disposed on the second shell.

9. The measurement fixture as in claim 8, wherein the second shell comprises a battery recess, the battery recess has a datum reference surface, and the battery cell is disposed in the battery recess on the datum reference surface.

10. The measurement fixture as in claim 1, further comprising a pressure relief valve arranged to the first shell.

11. The measurement fixture as in claim 1, wherein the at least one contactor comprises two contactors and the at least one terminal comprises a positive terminal and a negative terminal, and the two contactors respectively contact the positive terminal and the negative terminal of the battery cell and respectively connect the positive terminal and the negative terminal to the apparatus.

12. The measurement fixture as in claim 1, wherein the contactor comprises at least one cantilever contact electrically connecting the terminal of the battery cell.

13. The measurement fixture as in claim 1, wherein the contactor comprises at least one spring pin contact electrically connecting the terminal of the battery cell.

14. The measurement fixture as in claim 1, wherein the expansion sensor is removed from the chamber after the correlation between the pressure in the battery cell and the volume change of the battery cell is calculated.

15. The measurement fixture as in claim 1, wherein the expansion sensor measures a distance from an inner wall of the chamber to a surface of the battery cell.

16. The measurement fixture as in claim 15, wherein the expansion sensor is a capacitive sensor, an inductive sensor, a laser reflection sensor or an image sensor.

* * * * *